United States Patent [19]

Tveter et al.

[11] Patent Number: 4,715,214
[45] Date of Patent: Dec. 29, 1987

[54] LEAK TESTER

[75] Inventors: Richard S. Tveter, Barrington; Wayne A. Miller, Elgin, both of Ill.

[73] Assignee: S. Himmelstein and Company, Hoffman Estates, Ill.

[21] Appl. No.: 914,925

[22] Filed: Oct. 3, 1986

[51] Int. Cl.$^4$ .............................................. G01M 3/26
[52] U.S. Cl. ................................... 73/49.2; 364/552; 73/40
[58] Field of Search .................... 73/49.2, 40, 40.5 R; 364/509, 510, 552, 558, 507

[56] References Cited

U.S. PATENT DOCUMENTS

| | | | |
|---|---|---|---|
| 3,962,905 | 6/1976 | Jouve | 73/40.5 R |
| 4,078,421 | 3/1978 | Gastaldo et al. | 73/49.2 |
| 4,449,392 | 5/1984 | Huschke | 73/40 |
| 4,587,619 | 5/1986 | Converse, III et al. | 73/49.2 |
| 4,608,857 | 9/1986 | Mertens et al. | 73/49.1 |

Primary Examiner—Stewart J. Levy
Assistant Examiner—Hezron E. Williams
Attorney, Agent, or Firm—Wood, Dalton, Phillips, Mason & Rowe

[57] ABSTRACT

A method and apparatus for quickly determining leakage in pressurized fluid receptors. Pressure determinations are made substantially immediately following the completion of the filling of the item to be tested with the pressurized fluid without the need for a stabilization period. The complete decay curve is calculated from the pressure determinations. A time constant is determined from the curves defined when no leakage is present and is utilized in determining the leakage rate whenever the two curves defined by the pressure points provide different end pressure values. The determinations may be made by conventional microprocessor-based instrumentation to provide a substantial increase in the rate of conducting fluid leakage tests.

16 Claims, 4 Drawing Figures

LEAK TESTER

TECHNICAL FIELD

This invention relates to leak testers and in particular to high speed leak testers.

BACKGROUND ART

It is conventional to test the possible leakage of a container by firstly introducing into the container a body of fluid under pressure. At the end of a fill time in which the desired quantity of fluid is introduced into the container, the container is closed off. The introduction of the fluid under pressure into the container causes a temperature change of the fluid, and the container is permitted to stand for a preselected period of time to stabilize the pressure thereof by allowing the fluid to attain the temperature of its surrounding.

Following the stabilization period, the pressure of the fluid is measured over a second period of time which, in the conventional fluid testing systems of the past was commonly approximately equal to the stabilization time.

Upon completion of the pressure measurement, the container is vented, allowing the pressure to return to atmospheric.

Where tests are to be made on a number of containers, such as in assembly line operations where the containers are being filled at relatively high rates, it is a desideratum to minimize the total stabilization and test time. One attempted solution to this problem has been to shorten the stabilization time by making an estimation of, and correcting for, a residual stabilization pressure at the end of a shortened stabilization period. This has not proven completely satisfactory because of inaccuracies resulting from the estimates required for the speeded-up testing process and because of part-to-part variations.

DISCLOSURE OF INVENTION

The present invention comprehends an improved leakage test system wherein the leakage determination is made without requiring a stabilization period or a determination of the pressure of the fluid in the container following such a stabilization period.

More specifically, the present invention comprehends making a number of pressure determinations seriatim immediately after a settling period to avoid any false measurements during perturbations in the fluid pressure resulting from pressurization transients, transients caused by closing the fill valve, etc.

The invention comprehends the determination mathematically of the decay curve based on the pressure determination at the preselected intervals.

A determination is further made as to whether the end value of the decay curve determined by a first set of such test values corresponds to the end value of a second, different set of such test values.

The invention comprehends that a portion of the test values of the two sets may be the same test values.

Where the two values of the two differently determined decay curves differ, the invention comprehends the determination of a decay rate of the leakage by determining the differential between the two end values and the time constant of the exponential curve defining the pressure change due to stabilization of the fluid in the absence of any leakage.

More specifically, the invention comprehends the provision of an improved leak tester having means for providing pressurized fluid into a chamber of a fluid receptor, means for isolating the chamber subsequent to provision of the fluid therein, and means for sensing the pressure of the fluid in the isolated receptor. Means are provided for sequentially determining the sensed pressure at at least four different times during a measuring period following the isolation of the chamber, during which period the pressure in the isolated chamber changes exponentially due to stabilization of the pressurized fluid therein to a substantially constant value, means for calculating from a first group of at least three successive pressure determinations a first end pressure to which the fluid pressure should drop after infinite time and calculating from a second, subsequent group of at least three successive pressure determinations a second end pressure to which the fluid pressure should drop after infinite time, means for comparing the first and second calculated end pressures and determining a differential therebetween, means for determining a characteristic of the exponential curve defining the rate of the pressure drop due to the cooling of the pressurized fluid, and means for calculating the leak rate from the value of the determined characteristic and the determined pressure differential.

In the illustrated embodiment, the means for determining the characteristic of the exponential curve comprises means for effectively determining the time constant thereof.

In the illustrated embodiment, the measuring period is delayed to start following a short settling period during which aberrations in the pressure, such as due to closing of the filling valve, may occur.

In the present invention, the second group of pressure determination includes at least the last pressure determination of the first group.

The invention comprehends the provision of means for repeatedly updating the determined time constant as successive tests are conducted.

The invention comprehends the determination of the time constant from determined curves relating to a container pressure test wherein no differential is determined between the first and second calculated end pressures.

The invention comprehends the improved method of testing fluid receptors for leakage comprising the steps of providing pressurized fluid into a chamber of the fluid receptor, isolating the chamber subsequent to provision of the fluid thereinto, sensing the pressure of the fluid in the isolated receptor, sequentially determining the sensed pressure at at least four different times during a stabilization period following the isolation of the chamber during which period the pressure in the isolated chamber changes exponentially due to a stabilization of the pressurized fluid therein to a substantially constant value, calculating from a first group of at least three successive pressure determinations a first end pressure which the fluid pressure should attain after infinite time and calculating from a second, subsequent group of at least three successive pressure determinations a second end pressure which the fluid pressure should attain after infinite time, comparing said first and second calculated end pressures and determining a differential therebetween, determining a characteristic of the exponential curve defining the rate of the pressure change due to the stabilization of the pressurized fluid, and calculating the leak rate from the value of the determined characteristic and the determined pressure differential.

Thus, the present invention comprehends a novel method and apparatus for testing fluid receptors for leakage wherein a number of pressure determinations are made during the stabilization period wherein the fluid pressure changes due to stabilization thereof and the end point of curves determined from the pressure determinations are compared and utilized in determining the leakage rate of leaking tested fluid receptors.

The invention is extremely simple and economical of construction and use, while yet providing the highly desirable features discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
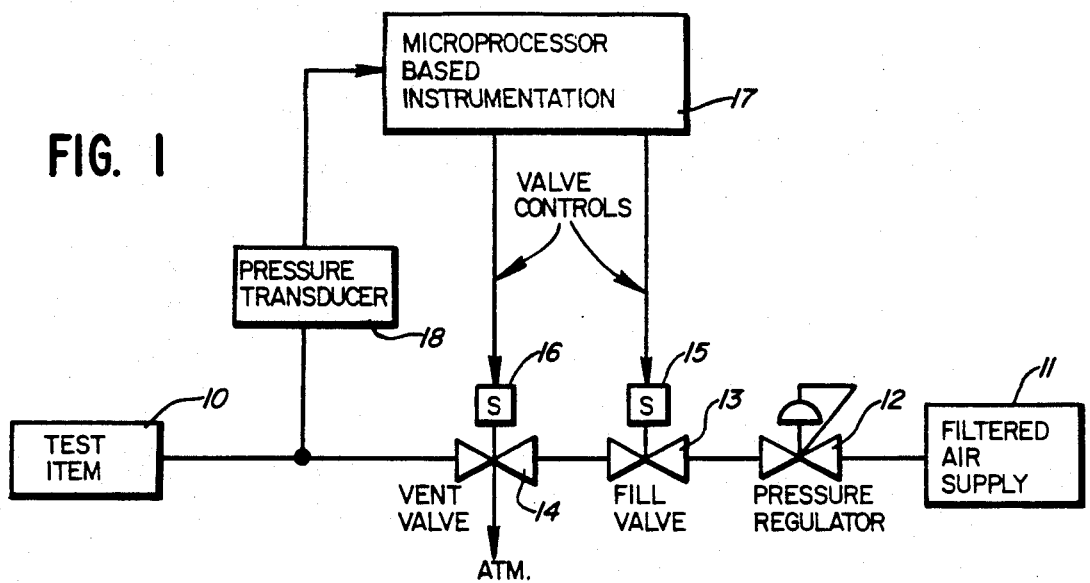
FIG. 1 is a schematic diagram illustrating a leak test system of the invention.

In the illustrative embodiment of the invention, a test fluid receptor generally designated 10 is connected to a pressurized filtered air supply generally designated 11 through a pressure regulator 12, a fill valve 13, and a vent valve 14.

The fill and vent valves may comprise solenoid-operated valves having solenoid operators 15 and 16, respectively, controlled from a microprocessor control 17.

A pressure sensor transducer 18 is connected between the test item and the control 17 for indicating the fluid pressure within the test item.

Figure 2:
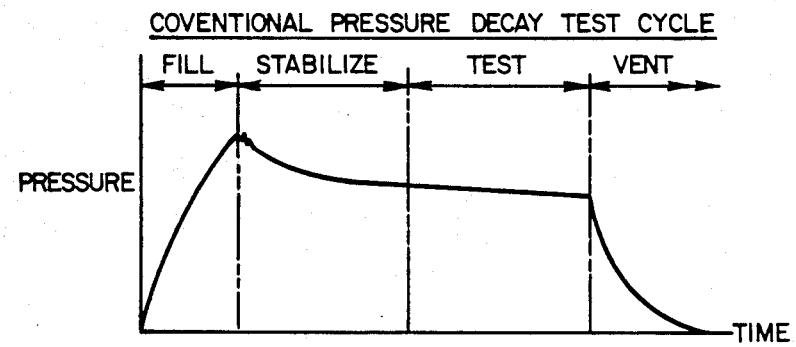
FIG. 2 is a graph illustrating a conventional pressure decay test cycle.

It has been conventional to determine leakage from the test item 10 by allowing the pressure to stabilize for a period of time after the test item is isolated by closing the fill valve. As shown in FIG. 2, the pressure sensed by transducer 18 changes exponentially after an initial settling period wherein aberrations in the pressure may occur as from the closing of the valve.

It has heretofore been conventional to allow the pressure change due to the stabilization of the fluid, which was thermally affected by the introduction thereof into the test item, to reach substantially its end value and then to undertake the pressure determination. While, as shown in FIG. 2, the pressure determinations made during the test period are taken during a time wherein a small further decrease in the pressure due to further stabilization of the pressurized fluid may occur, the further pressure change is so small that it has been conventional to consider any change between the pressure at the beginning of the test period and at the end of the test period as insignificant. Thus, any determined pressure differential has been considered to represent leakage of the fluid receptor.

At the end of the test period, the vent valve is opened and the pressurized fluid allowed to pass from the test item to complete the test.

Figure 3:
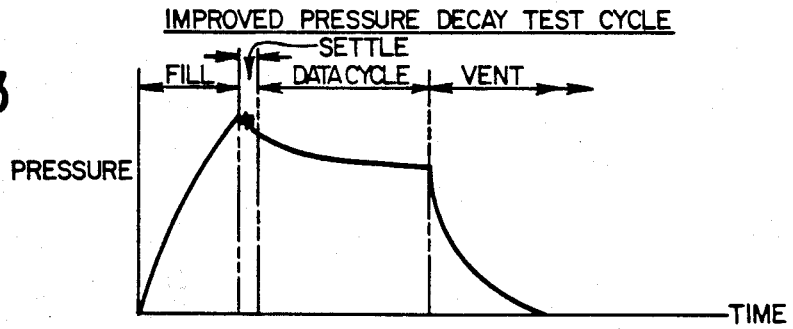
FIG. 3 is a graph illustrating the pressure decay test cycle of the present invention.

Referring now to FIG. 3, the present invention comprehends an improved method of determining leakage in such a receptor wherein the stabilization period is effectively eliminated and pressure determinations are made during the time the fluid pressure is changing exponentially due to the thermal stabilization thereof. Thus, the present invention eliminates the wait for the pressure to change to substantially its final decay value, thereby effectively cutting the test time substantially in half, as shown in FIG. 3. At the end of the data cycle, or pressure determination period, the vent valve 14 is open, whereby the pressure drops to atmospheric, as shown in FIG. 3.

The beginning of the determination period is delayed until the end of the short settling period, which conventionally is no more than approximately 100 milliseconds. Thus, the beginning of the determination period starts almost immediately after the closing of the fill valve but sufficiently thereafter to avoid any erroneous readings due to the aberrations and perturbations in the pressure resulting from the closing of the valve.

The invention comprehends the determination of a pair of decay curves defined by a plurality of pressure determinations made seriatim at preselected equal intervals during the data cycle, or leakage determination, period.

Figure 4:
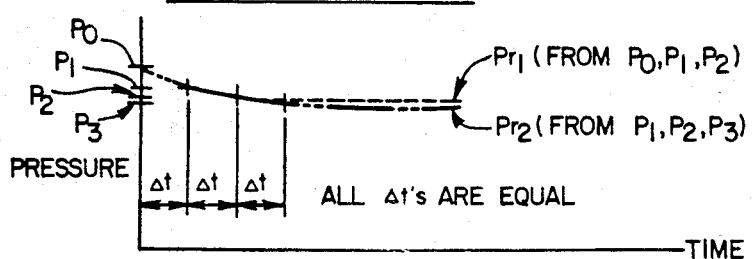
FIG. 4 is a graph illustrating in greater detail the data analysis of the present invention.

Thus, as seen in FIG. 4, a first determination is made in the pressure at the start of the data cycle. Second, third and fourth pressure determinations are made at subsequent incrementally different times so as to provide at least four successive pressure determinations identified as P0, P1, P2, and P3.

Utilizing the first three of the data points, or pressure determinations, the exponential curve fitting these three points is determined and the value of the pressure at which the system will stabilize is calculated. The value of the pressure at which the pressure will stabilize corresponds to the value at the end of the stabilization and test periods of the conventional cycle illustrated in FIG. 2.

A second curve is determined from the points P1, P2, and P3, and the pressure at which the system will stabilize in accordance with that curve is determined.

Where there is no leak, the end points PR1 and PR2 are equal as all four of the sensed pressure values must lie on a single exponential pressure decay curve.

Where the end pressure values are not equal, as determined from the two curve determinations, it is obvious that a leak has occurred, causing the end pressure differential.

The invention comprehends determining the leak rate from the determined end point differential and the time constant of the exponential curve representing the pressure decay when there is no leakage.

Thus, if the calculated end pressure values $P_R$ are essentially equal, the time constant of the exponential curve is calculated and stored. Each time such a non-leaking test is conducted, the time constant is so calculated and stored so as to provide a constant updating of the time constant during a series of tests on such fluid receptors.

Where a differential in the end pressure is determined, the leakage rate is readily determined in the following manner.

As the exponentially changing pressure curve defines a constant rate of change, determining three successive measurements at equal intervals permits the calculation of the next measurement:

$$P_2 = P_R + (P_1 - P_R)\frac{P_1 - P_R}{P_0 - P_R}$$

where
$P_R$ is the pressure that the system will stabilize at, if there is no leak;
$P_0$ is the pressure when pressurizing is complete;
$P_1$, $P_2$, and $P_3$ are pressures at times T1, T2, and T3.
Solving for $P_R$, we get;

$$P_R = \frac{P_1^2 - P_0 P_2}{2P_1 - P_0 - P_2}, \text{ and } P_{R1} = \frac{P_i^2 + 1 - P_i P_i + 2}{2P_i + 1 - P_i - P_i + 2}$$

where i is any integer.

Because of the nature of exponential decay, the $P_R$ calculated for any set of 3 adjacent points on the curve will yield the same value for $P_R$.

The time constant, TC, of the exponential decay is determined as follows:

$$TC = \frac{1}{\left(\frac{P_0 - P_1}{P_0 - P_R}\right)} = \frac{(P_0 - P_R)}{(P_0 - P_1)}$$

where $P_0$ and $P_1$ are 1 second apart.

Having determined the time constant for the exponential curve resulting solely from the thermal stabilization of the pressurized fluid following filling of the receptor, the leak rate is determined from the time constant and any difference in the two calculated end pressure $P_R$ values by the following formula:

$$y = ax^2 + bx + c$$

where y is the difference between $P_R$'s:
that is $$y = P_{R123} - P_{R234}$$

a = Time Constant
b = 1
c = $\phi$
x = leak rate,
which reduces to:

$$ax^2 + bx - y = \phi;$$

$$x = \frac{-1 + \sqrt{b^2 + 4ay}}{2a} = \frac{-1 + \sqrt{1 + 4(TC - \nabla P_R)}}{2TC}$$

As indicated above, the calculations set out above may be carried out manually or by any suitable conventional microprocessor-based instrumentation type of control 17 well-known to those skilled in the art. The specific instrumentation forms no part of the invention.

Thus, the present invention comprehends broadly the determination of the end values of the pressure decay curves determined by different sets of pressure determination values made during the time the pressure is approaching a stabilized substantially end value. Thus, the present invention eliminates the need for a stabilization period, as utilized in the prior art, prior to the pressure determination. The invention comprehends the determination of pressure values during the decaying portion of the exponential curve in utilizing these determinations to define the full exponential curve and the end values thereof without requiring actual measurement thereof. As discussed above, the utilization of the method and apparatus of the invention substantially cuts the time heretofore required for effecting such leak testing operations.

The invention further comprehends the constant updating of the time constant determination utilized in calculating the leakage rate from the end point pressure differential. Such updating of the time constant may be automatically effected whenever a test is conducted wherein no differential is found in the end point pressure calculated from the two curves defined by the different sets of pressure values utilized as discussed above. Alternatively, a single time constant may be calculated for a given type of fluid receptor and all subsequent leakage determinations made utilizing the predetermined time constant.

The invention broadly comprehends determining the end points of two curves defined by different sets of pressure determination values and whenever a difference in the end values of the two curves occurs eliminating the exponential decay portion of the curves to arrive at the leakage portion. In the present invention, this is done by determining the time constant of the exponential portion.

The invention comprehends the updating of the time constant to avoid errors due to equipment changes, environmental temperature changes, or other environmental factors.

In the illustrated embodiment, each set of pressure value determinations consists of three values. A second set includes the last two of the first set so that only four total determinations are necessary. As will be obvious to those skilled in the art, any two sets of three determinations may be utilized in defining the two curves.

As will be apparent to those skilled in the art, the same principle can be employed with other hardware arrangements, such as using differential pressure transducers and reference volumes, without affecting the principle or its validity.

The foregoing disclosure of specific embodiments is illustrative of the broad inventive concepts comprehended by the invention.

We claim:

1. In a leak tester having means for providing pressurized fluid into a chamber of a fluid receptor, means for isolating said chamber subsequent to provision of the fluid therein, and means for sensing the pressure of the fluid in said isolated receptor, the improvement comprising:
   means for sequentially determining the sensed pressure at at least four different times during a measuring period following the isolation of the chamber during which period the pressure in said isolated chamber changes exponentially due to a stabilization of the pressurized fluid therein toward a substantially constant value;
   means for calculating from a first group of at least three successive pressure determinations a first end pressure to which the fluid pressure should stabilize and calculating from a second, subsequent group of at least three successive pressure determinations a second end pressure to which the fluid pressure should stabilize;

means for comparing said first and second calculated end pressures and determining a pressure differential therebetween;

means for determining a characteristic of the exponential curve defining the rate of the pressure drop due to the stabilization of the pressurized fluid; and means for calculating the leak rate from the value of the determined characteristic and the determined pressure differential.

2. The leak tester of claim 1 wherein said means determining said characteristic of the exponential curve comprises means effectively determining the time constant thereof.

3. The leak tester of claim 1 wherein the measuring period is caused to start following a short settling period following the isolation of the chamber.

4. The leak tester of claim 1 wherein said measuring period comprises a period of sufficient duration for the pressure change due to stabilization of the fluid to be longer than the period required for initial pressure transients to subside.

5. The leak tester of claim 1 wherein said second group of pressure determinations includes at least the last pressure determination of said first group.

6. The leak tester of claim 1 wherein said second group of pressure determinations includes at least two pressure determinations of said first group.

7. The leak tester of claim 1 wherein said means determining said characteristic of the exponential curve comprises means effectively determining the time constant thereof and further comprises means for repeatedly updating the determined time constant as successive tests are conducted on a plurality of such fluid receptors.

8. The leak tester of claim 1 wherein said means determining said characteristic of the exponential curve comprises means effectively determining the time constant thereof and further comprises means for repeatedly updating the determined time constant as successive tests are conducted on a plurality of such fluid receptors whenever no differential is determined in the step comparing the first and second calculated end pressures.

9. The method of testing fluid receptors for leaking comprising the steps of:

providing pressurized fluid into a chamber of the fluid receptor;

isolating said chamber subsequent to provision of the fluid thereinto;

sensing the pressure of the fluid in said isolated receptor;

sequentially determining the sensed pressure at at least four different times during a stabilization period following the isolation of the chamber during which period the pressure in said isolated chamber changes exponentially due to a stabilization of the pressurized fluid therein toward a substantially constant value;

calculating from a first group of at least three successive pressure determinations a first end pressure to which the fluid pressure should change after infinite time and calculating from a second, subsequent group of at least three successive pressure determinations a second end pressure to which the fluid pressure should attain after infinite time;

comparing said first and second calculated end pressures and determining a differential therebetween;

determining a characteristic of the exponential curve defining the rate of the pressure change due to the stabilization of the pressurized fluid; and calculating the leak rate from the value of the determined characteristic and the determined pressure differential.

10. The method of testing fluid receptors of claim 9 wherein said step of determining said characteristic of the exponential curve comprises a step of effectively determining the time constant thereof.

11. The method of testing fluid receptors of claim 9 wherein the measuring period is caused to start following short settling period following the isolation of the chamber.

12. The method of testing fluid receptors of claim 9 wherein said measuring period comprises a period of sufficient duration for the pressure change due to stabilization of the fluid to be approximately 25% of the total pressure change due to cooling of the fluid which would occur during a decay period of infinite time.

13. The method of testing fluid receptors of claim 9 wherein said second group of pressure determinations includes at least the last pressure determination of said first group.

14. The method of testing fluid receptors of claim 9 wherein said second group of pressure determinations includes at least the last two pressure determinations of said first group.

15. The method of testing fluid receptors of claim 9 wherein said step of determining said characteristic of the exponential curve comprises a step of effectively determining the time constant thereof and repeatedly updating the determined time constant as successive tests are conducted on a plurality of such fluid receptors.

16. The method of testing fluid receptors of claim 9 wherein said step of determining said characteristic of the exponential curve comprises a step of effectively determining the time constant thereof and repeatedly updating the determined time constant as successive tests are conducted on a plurality of such fluid receptors wherein no differential is determined in the step of comparing the first and second calculated end pressures.

* * * * *